Feb. 15, 1966 H. D. CRANE 3,235,851

CORE MEMORY DEVICE

Filed March 3, 1958 3 Sheets-Sheet 1

INVENTOR.
HEWITT D. CRANE
BY Christie, Parker & Hale
ATTORNEYS

Feb. 15, 1966 H. D. CRANE 3,235,851

CORE MEMORY DEVICE

Filed March 3, 1958 3 Sheets-Sheet 2

INVENTOR.
HEWITT D. CRANE
BY Christie, Parker & Hale
ATTORNEYS

Feb. 15, 1966 H. D. CRANE 3,235,851

CORE MEMORY DEVICE

Filed March 3, 1958 3 Sheets-Sheet 3

INVENTOR.
HEWITT D. CRANE
BY Christie, Parker & Hale
ATTORNEYS

United States Patent Office
3,235,851
Patented Feb. 15, 1966

3,235,851
CORE MEMORY DEVICE
Hewitt D. Crane, Palo Alto, Calif., assignor to Burroughs Corporation, Detroit, Mich., a corporation of Michigan
Filed Mar. 3, 1958, Ser. No. 718,886
1 Claim. (Cl. 340—174)

This invention relates to binary bit storage circuits, and more particularly, is concerned with a storage circuit using a magnetic core as the storage element.

The use of magnetic cores made of ferrite magnetic material which has a high remanence characteristic for the storage of binary bits is well known. Generally a single binary bit is stored in a single core element, a plurality of core elements being used to store larger amounts of binary information. The value of the binary bit stored is determined by the direction of the saturation flux in the core, i.e., flux in one direction represents a binary zero and flux in the opposite direction represents a binary one.

The present invention has the advantage over such prior art core storage devices in that a number of binary bits can be stored in a single core. Thus the number of cores required to store a given amount of information can be considerably reduced. This is accomplished in the present invention by providing a magnetic core circuit in which binary bits are stored in zones of increasing radii in the core. The direction of flux in these flux zones within the core are indicative of the value of the binary bits being stored.

In brief, the invention comprises an annular core having a first winding wound on the core. Means is provided for generating a succession of pulses of decreasing amplitude. The polarity of these successive pulses is made positive or negative, depending upon whether a binary one or a binary zero is to be stored in the core in response to a particular pulse. The pulses of successively decreasing amplitude and of coded polarity are applied to the first winding. By virtue of the successively decreasing amplitude of the pulses, the pulses switch flux in annular portions of the core of successively decreasing radii. The direction of the flux in the zones of decreasing radii is determined by the polarity of the successive pulses, whereby the binary information bits are stored as zones of flux having predetermined directions indicative of the value of the binary bits stored. Readout means is provided, including a second winding on the core. During readout, a continuously increasing sawtooth-type current is applied through the one winding, whereby pulses are induced in the other winding in response to flux reversal in the particular zones in which the flux is reversed by the readout voltage.

For a more complete understanding of the invention, reference should be had to the accompanying drawings, wherein.

Figure 5:
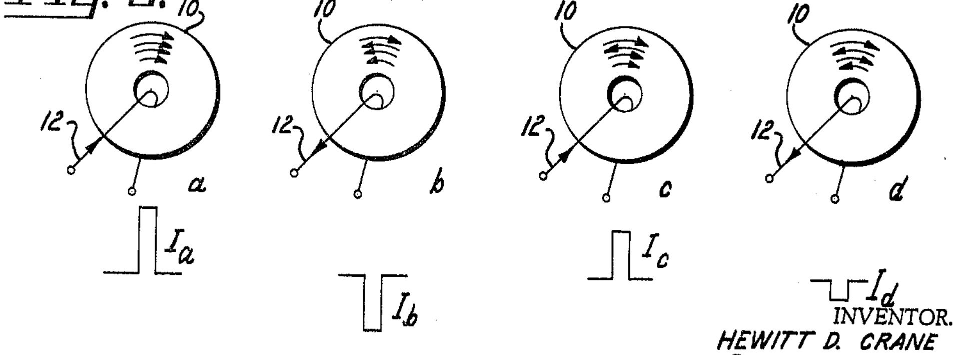
Figure 6:
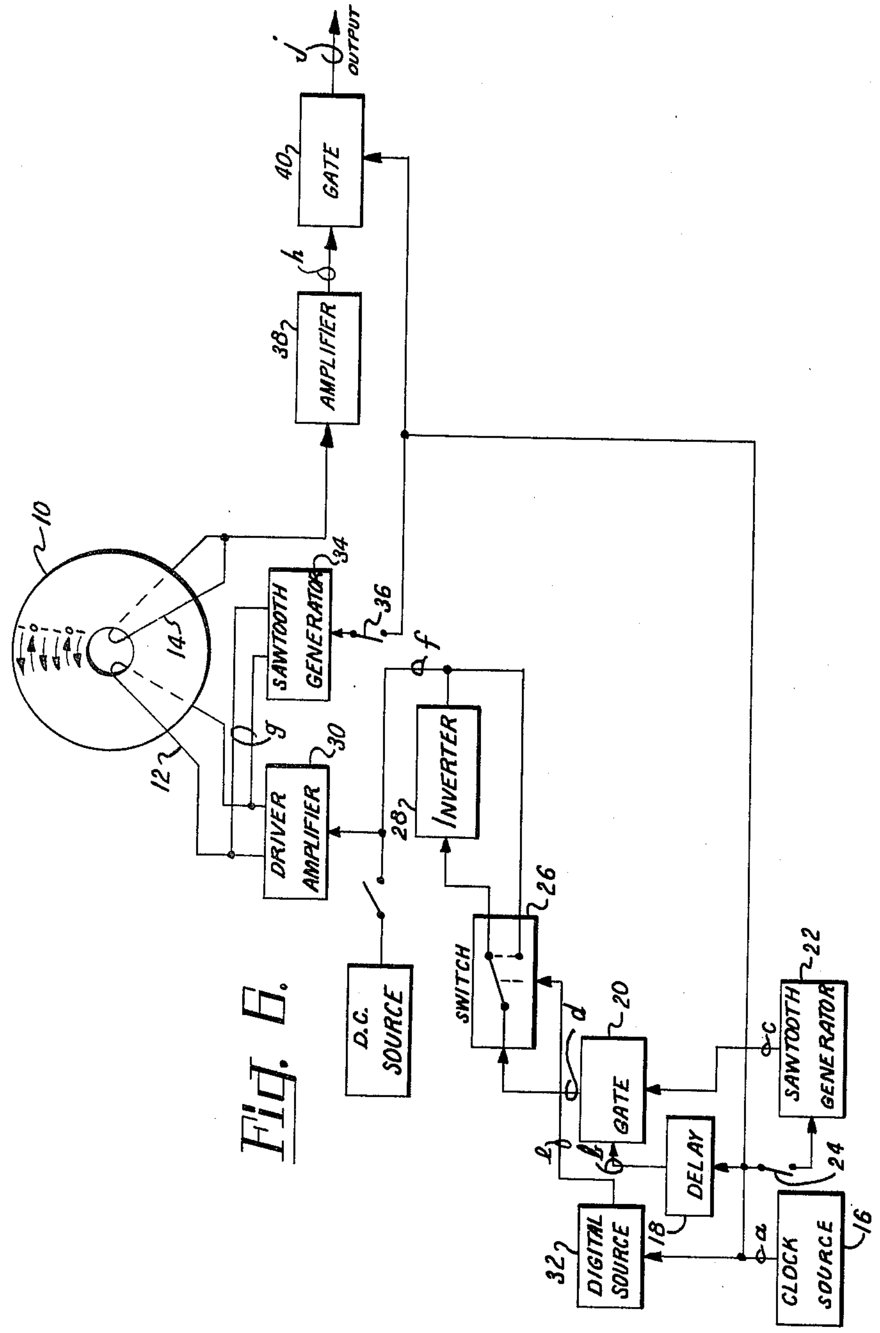
Figure 7:
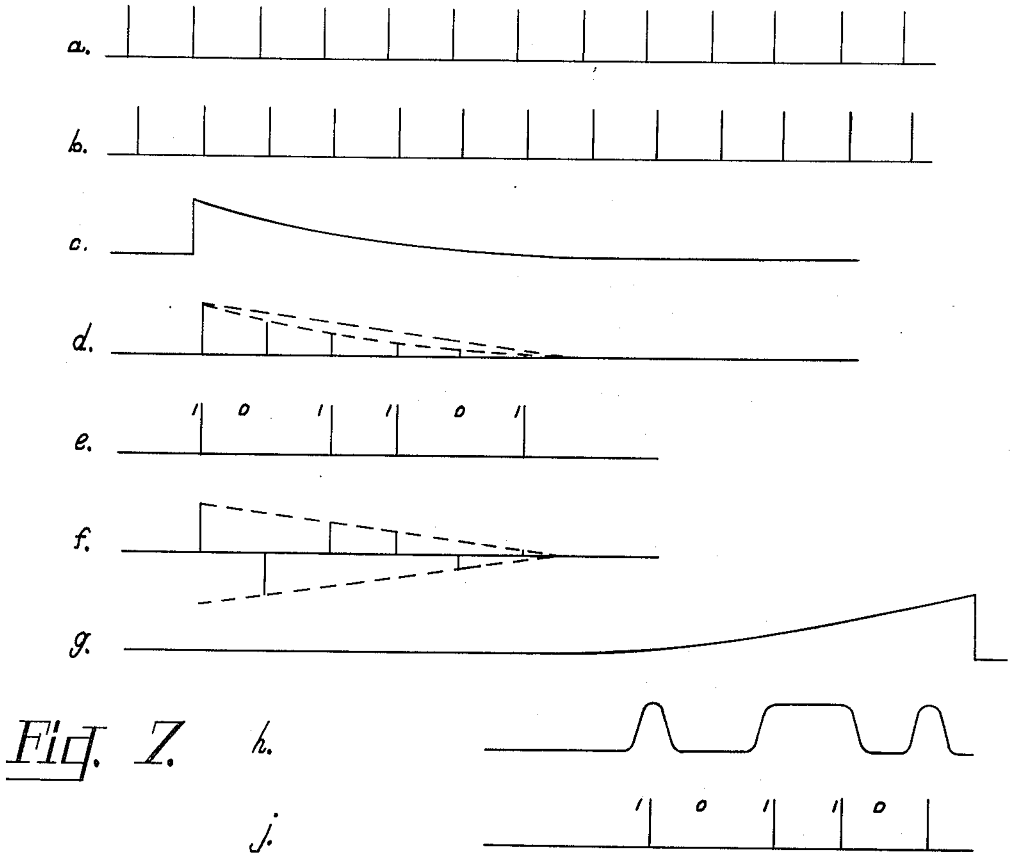
Figure 8:
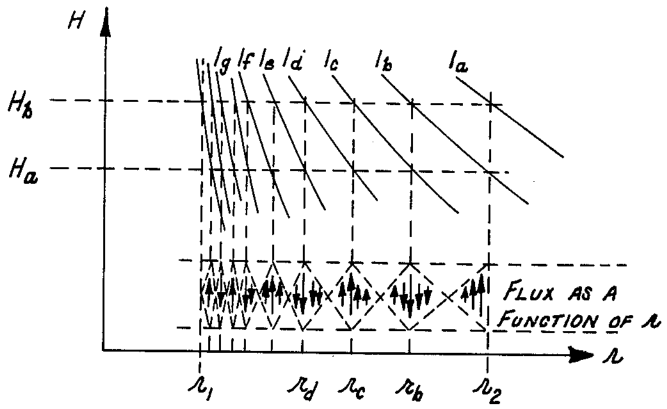

FIG. 5*a–d* shows the core in successive stages of flux setting;

FIG. 6 is a block diagram of one embodiment of the invention;

FIG. 7*a–j* is a series of waveforms of signals existing in the circuit of FIG. 6; and FIG. 8 is a graphical representation of the field intensity as a function of radius in the core of FIG. 5 in which the flux is set in zones.

Figures 1, 2, 3:
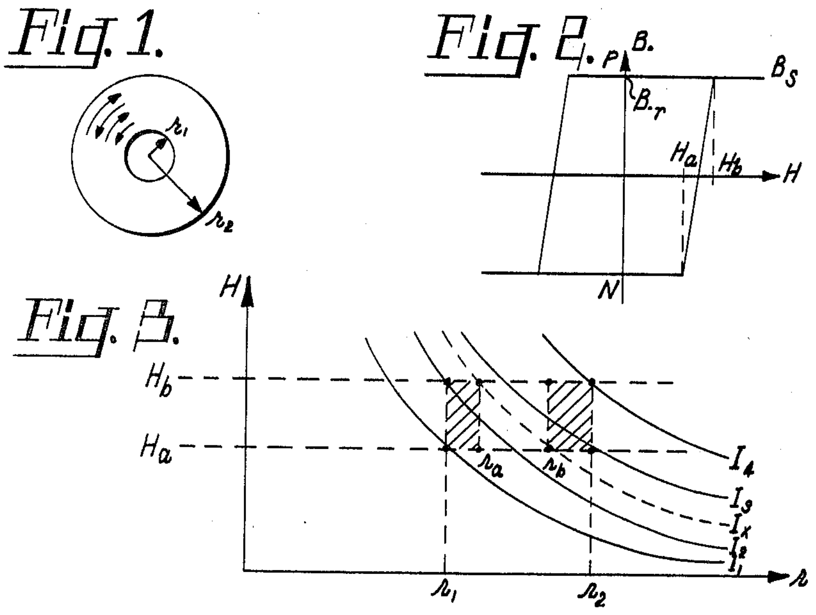
FIG. 1 shows an annular core of ferromagnetic material used as the storage element in the present invention.
FIG. 2 shows an idealized B–H hysteresis curve for the annular core of FIG. 1.
FIG. 3 is a graphical representation of the field intensity as a function of radius within the core of FIG. 1.

For a better understanding of the principles of the present invention, it is important to understand some of the basic characteristics of magnetic core devices. Consider an annular core as shown in FIG. 1, made of magnetic material having a very high remanence characteristic, i.e., one in which the magnetic remanence is substantially equal to the magnetic saturation. Suitable ferromagnetic materials having such characteristics include ferrite and Permalloy. An idealized hysteresis curve for such material is shown in FIG. 2. As can be seen from FIG. 2, the magnetic remanence $B_r$, after a saturating field is removed, is substantially the same as the magnetic saturation $B_s$.

It is known that in a perfectly symmetrical core such as shown in FIG. 1, the field produced by a current passing through the center of the core is a hyperbolic function of radius. This relation is shown in graphical form in FIG. 3, in which the field H is plotted as a function of the radius $r$ within the core for different values of current I passing through the center of the core. Referring again to FIG. 2, it will be seen that with any portion of the core completely saturated in one direction, indicated as the N state, an applied field $H_a$ must be applied before the remanent induction can be changed at all and a field $H_b$ must be applied to completely saturate that portion of the core in the opposite direction, indicated as the P state. If the applied field has a value between these two limits, the remanent induction will be brought to some intermediate value between the two saturated states N and P. The field level $H_a$ is referred to as the threshold field.

As shown in FIG. 3, if a current $I_1$ is passed through the center of the annular core of FIG. 1, the core having an inner radius $r_1$ and an outer radius $r_2$, the field at the inside radius $r_1$ is brought to just the field intensity level $H_a$. Thus if the current $I_1$ is removed, the flux condition of the core will remain unchanged. If a current $I_2$ is passed through the center of the core, the field at the inner radius $r_1$ is brought to the value $H_b$, which is sufficient to completely reverse the flux at this radius to produce saturation in the P state. However, at increasing radii within the core, less and less flux is switched by the applied current $I_2$, according to the relation shown in FIG. 3. Not until the current is increased to a value of $I_3$ is the entire core subjected to at least a field intensity of $H_a$ out to the outer radius $r_2$. Further increase of the current to a level $I_4$ brings the entire core out to its outer radius $r_2$ to a field intensity $H_b$, which is sufficient to reverse the flux in the entire core and bring the entire core to saturation in the P state.

Figure 4:
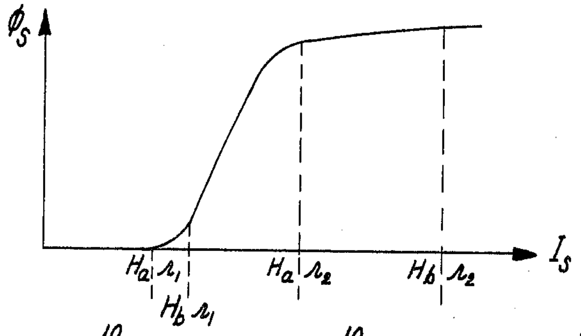
FIG. 4 is a plot of flux switched in the core of FIG. 1 as a function of current.

It will be apparent from a study of the curves of FIG. 3 that if a current of some intermediate value $I_x$ is passed through the center of the core, the material from the inner radius $r_1$ to some radius $r_a$, corresponding to the radius at which the current $I_x$ produces a field intensity $H_b$, has been completely switched from state N to state P. In the outer region extending from the radius $r_b$ to the outer radius $r_2$, none of the flux has been switched and the material remains in the state N. However, in an intermediate region from radius $r_a$ to radius $r_b$ there is a transition region. The width of the transition region depends upon the squareness of the hysteresis curve of the particular core material being used. Thus it will be seen that by carefully controlling the value of the current passed through the center of a core of magnetic material having a high remanence characteristic, regions can be set up in which the flux is saturated in opposite directions, as indicated by the arrows in FIG. 1. A typical curve of flux switched as a function of drive current is shown in FIG. 4.

Referring to FIG. 5, there is shown a succession of single aperture cores in which the flux is set in zones as shown by the arrows. Thus in FIG. 5*a*, a large positive current is passed through the central aperture by means of the winding 12 wound on the core 10. The magnitude of the current pulse is indicated by the rectangular pulse shown below the core. This pulse is of sufficient magnitude to switch all the flux in the core in a clockwise direction, which means the current exceeds the value of the current $I_4$ in FIG. 3.

In FIG. 5*b*, a pulse of opposite polarity and smaller amplitude is applied to the winding 12, the pulse being indicated graphically below the core in FIG. 5*b*. The effect of this pulse is to reset a portion of the flux, but the pulse is not of sufficient magnitude to reverse flux out to the outer radius of the core. In FIG. 5*c*, still a smaller positive pulse is applied to the winding 12. The result is that flux is switched in a region of yet a smaller radius. In FIG. 5*d*, a still further negative pulse is applied which is sufficient only to switch flux at the inner radius of the core. In this manner it is possible to set up concentric zones within the core in which the flux is set in one direction or the other.

If now a sawtooth current pulse of increasing amplitude is applied through the input winding, the flux in the core is progressively swept out to a clockwise state. In any of the zones where the flux was previously set to a counterclockwise state, a flux reversal takes place. If an output winding 14 is provided linking the central aperture of the core, a pulse will be induced in this winding every time flux is reversed in one of the zones by the sawtooth-shaped readout pulse.

Referring to FIG. 8, there is shown a series of curves similar to those shown in FIG. 3, the curves representing the current levels produced by the successively smaller pulses of reversed polarity applied to the core 10 as described above in connection with FIG. 5. It will be seen that efficient packing is obtained if the initial current $I_a$ is of sufficient strength to saturate the entire core, the negative current pulse $I_b$ should only be large enough to make the field at the radius $r_2$ equal to $H_a$, the next positive current pulse $I_c$ should only be large enough to make the field at the radius $r_b$ equal to $H_a$, etc.

Due to the hyperbolic relation of H and *r*, the flux zones are more closely packed at the inner radii. The number of zones, *n*, that can be so packed is approximately obtained by solving the equation $S^n=R$, where S is equal to $H_b/H_a$ and relates to the squareness of the hysteresis curve of the material, and R is equal to $r_2/r_1$ and relates to the radial thickness of the core. For example, a core having a ratio of 6:1 between the outer and inner radii and made of a material in which S is equal to 1.2 makes *n* equal to 9.

A practical memory circuit using the principles described above is shown in FIG. 6. The circuit includes a clock source 16, which generates periodic pulses, as shown graphically in FIG. 7*a*. The output from the clock source 16 is coupled through a delay circuit 18 to a gate circuit 20 whereby the gate circuit 20 is gated open periodically a delayed time interval following each clock pulse from the source 16. The delayed clock pulse output applied to the gate 20 is shown in FIG. 7*b*. The gate 20 is also connected to a sawtooth generator 22. Actuation of the generator 22 is initiated by a clock pulse from the source 16 when a starting switch 24 is closed. The sawtooth generator 22 is arranged to generate a rapidly rising voltage that slowly declines. The waveform from the output of the sawtooth generator 22 is shown in FIG. 7*c*. Thus it will be seen that the output from the gate 20 is a plurality of pulses synchronized with the clock source 16, the pulses being of successively diminishing amplitude as determined by the sawtooth generator 22. The waveform of the output of the gate 20 is shown in FIG. 7*d*.

A switching circuit 26 is arranged to normally connect the output of the gate 20 to an inverter circuit 28 which inverts the polarity of the pulses coupled thereto. The output of the inverter circuit is connected to a driver amplifier 30 which drives the input winding 12 on the core 10. The switch 26, when actuated, connects the output of the gate 20 directly to the driver amplifier 30. Thus it will be seen, depending upon the condition of the switching circuit 26, pulses of one polarity or the other are applied to the driver amplifier 30 for pulsing current in one direction or the other through the input winding 12.

The switch 26 is controlled in response to binary information derived from a digital source 32. The source 32 may be a computer or other binary digital device which generates binary bits in serial fashion which are synchronized with the clock source 16. The binary information at the output of the digital source 32 is preferably in the form of a pulse at a clock time representing the binary digit one, and the absence of a pulse at a clock pulse time representing the binary digit zero. The output of the digital source 32 is connected to the switching circuit 26 for actuating the switch in response to the serial binary information. A typical output waveform for the digital source 32 is shown in FIG. 7*e*.

The switching circuit 26 is arranged to normally connect the gate 20 to the inverter 28. As long as the digital source 32 is putting out binary zeros, the switching circuit 26 is not actuated. However, whenever the digital source 32 puts out a binary digit one in the form of a pulse, the switching circuit 26 is momentarily actuated, thereby completing a circuit between the gate 20 and the driver amplifier 30 that bypasses the inverter 28. In this manner the polarity of the pulses applied to the driver amplifier 30 is controlled in response to the binary information derived from the digital source 32, while the amplitude of these pulses applied to the driver amplifier 30 successively decreases, as determined by the output of the sawtooth generator 22. The waveform of the pulses applied to the driver amplifier 30 is shown in FIG. 7*f*. The arrows on the core 10 in FIG. 6 show the resulting flux pattern in the flux zones of the core. Counterclockwise flux in a zone represents the binary digit one, and clockwise flux represents the binary digit zero.

To read out the information stored in the core 10, a second sawtooth generator, indicated at 34, is provided. The output of the sawtooth generator is applied to the input winding 12. The sawtooth generator 34, when triggered by a clock pulse from the source 16 following the closing of a switch 36, produces a slowly rising output current. The output of the generator 34 thereby continuously increases the current through the input winding 12 to sweep out the flux in the core 10 in a clockwise direction, so that at the end of the output pulse from the sawtooth generator 34, all the flux in the core 10 is switched back to a clockwise direction. If the field produced by the current in the input winding 12 increases to the point where it switches flux in zones of successively increasing radius, voltage pulses are induced in the output winding 14. Thus a voltage is derived from the output winding 14 as flux is swept out in time $$\left(e=\frac{d\phi}{dt}\right)_1$$

in response to the rising readout current. In particular a voltage is included as "one" zones are returned to the clockwise state.

The output winding 14 is coupled to an amplifier 38, the output of which is applied to a gate 40. The waveform of the output of the amplifier 38 is shown in FIG. 7*h*. The gate 40 is gated open periodically by the pulses from the clock source 16. If coincidence occurs between a clock pulse, and a pulse induced in the winding 14, an output pulse is derived from the gate. The waveform of the output is shown in FIG. 7*j*.

Thus it will be seen that the pulse pattern indicative of a series of binary digits is generated on readout which is identical but in reverse time sequence to the original pulse pattern. As many as ten binary bits can be stored on a single core and read out as needed at a later time.

What is claimed is:

A core memory device for storing and reading out binary bits comprising an annular core of magnetic material having a high flux remanence characteristic, a first winding wound on the core, means including a clock pulse source for generating a succession of pulses, means for decreasing the amplitude of successive pulses from said generating means, means including a switch for connecting the pulses with a first polarity or a second polarity to the first winding, a source of binary bits, means controlled by the source of binary bits for actuating said switch in response to a change in the binary value of successive binary bits to reverse the polarity of the pulses applied to said first winding, the pulses of the winding setting the flux in zones of decreasing radius in the annular core with the decreasing amplitude of the pulses, the direction of the flux in the zones being determined by the polarity of the pulses, whereby the binary information bits are stored as zones of flux having predetermined directions indicative of the value of the binary bits stored, and readout means including a second winding on the core and means for applying a continuously increasing voltage of fixed polarity across the first winding during readout, whereby pulses are induced in the second winding in response to flux reversal in zones in which the flux is switched by said voltage of fixed polarity.

References Cited by the Examiner

UNITED STATES PATENTS

| | | | |
|---|---|---|---|
| 2,805,408 | 9/1957 | Hamilton | 340—174 |
| 2,819,412 | 1/1958 | Kaplan | 307—88 |
| 2,870,433 | 1/1959 | Simpson | 340—174 |
| 2,958,787 | 11/1960 | Hardenbergh | 307—88 |

FOREIGN PATENTS

| | | |
|---|---|---|
| 760,048 | 10/1956 | Great Britain. |
| 780,884 | 8/1957 | Great Britain. |

OTHER REFERENCES

Proceeding of the IRE, vol 44, Issue 3, "The Transfluxor," by Rajchman et al., pages 321–332, March 1956.

RCA Review, vol. 16, "The Transfluxor," by Rajchman et al., page 303–311, June 1955.

IRVING L. SRAGOW, *Primary Examiner.*

EVERETT R. REYNOLDS, JOHN F. BURNS, STEPHEN W. CAPELLI, *Examiners.*